Patented Aug. 9, 1949

2,478,484

UNITED STATES PATENT OFFICE 2,478,484

PREPARATION OF ACYL THIOPHENES

Howard D. Hartough, Pitman, N. J., and Alvin I. Kosak, Columbus, Ohio, assignors to Socony-Vacuum Oil Company, Incorporated, a corporation of New York No Drawing. Application December 8, 1945, Serial No. 633,852

17 Claims. (Cl. 260—329)

This invention relates to a process for the acylation of thiophenes and more particularly is directed to a unique catalytic method for acylating thiophene and its derivatives.

Acylation reactions are well known in the art and connote the union between acyl radicals and molecules of organic compounds, the products thus produced represent, structurally, the substitution of an acyl radical on the organic compound molecule with the elimination of a hydrogen atom.

The acylation of thiophene and thiophene derivatives has been carried out in the past usually in the presence of catalysts of the Friedel-Crafts type such as aluminum chloride, titanium tetrachloride, and stannic chloride. Phosphorus pentoxide has also been employed to some extent as a catalyst in the acylation of thiophene. In all of these reactions carboxylic acid anhydrides or acyl halides have been used as acylating agents.

It has been recognized by those in the art that the use of an organic carboxylic acid for acylation purposes would be of extreme advantage in eliminating the necessity of preparing the corresponding acid anhydrides or halides and hence effecting a considerable saving in the acylation process. Thus, the acylation of aromatic compounds has in the past been accomplished with carboxylic acids employing relatively large amounts of aluminum chloride as a catalyst, that is amounts of the order of 2 to 3 moles of catalyst per mole of acid used. Attempts to acylate thiophene, however, under similar conditions employing a carboxylic acid in the presence of aluminum chloride proved futile and no acylated thiophene was obtained by this method.

It has now been found that by employing phosphorous pentoxide as a catalyst that acylation of thiophene can be accomplished using an organic carboxylic acid as acylating agent. This discovery is unique in the light of previous work carried out by Steinkopf and his co-workers (Ann. 424, 1 (1920)) in which a phosphorus pentoxide catalyst was employed for the synthesis of thienyl ketones from thiophene and an acid chloride or acid anhydride. The teachings of these workers indicated that an organic carboxylic acid took no part in the acylation process. This is in direct contradiction to the process of the present invention. The use of a carboxylic acid as acylating agent is of a very practical importance since the expense and time consumed in preparing the acylating agents formerly employed, namely, acid anhydrides and halides can thereby be eliminated resulting in an efficient and economical acylation process.

It is accordingly, an object of the present invention to provide an efficient process for synthesizing acylated thiophenes. Another object is to provide a process for catalytically acylating thiophene and its derivatives. A still further object is to afford a process for catalytically acylating thiophene in a direct manner which can be easily carried out with a relatively inexpensive acylating agent. A very important object is to provide a process capable of reacting thiophene or its derivatives with an organic carboxylic acid in the presence of a catalyst to yield an acylated thiophene.

These and other objects which will be recognized by those skilled in the art are attained in accordance with the present invention wherein thiophene or its derivatives are acylated by reaction with organic carboxylic acids in the presence of phosphorus pentoxide.

The process of this invention thus comprises the contact of thiophene or thiophene derivative, carboxylic acid and phosphorus pentoxide for a sufficient period of time and at a suitable temperature to yield after neutralization and distillation of the resulting product, an acylated thiophene. The process may be carried out employing equimolar quantities of thiophene and carboxylic acid. However, the presence of an excess of thiophene has generally been found to give an increased yield of the desired product.

The quantity of phosphorus pentoxide used herein may be conveniently expressed in terms of mole ratio as compared with the amount of carboxylic acid acylating agent used. Thus, the amount of phosphorus pentoxide employed will generally be between about 0.05 and about 1.0 moles per mole of carboxylic acid used. However, these amounts while preferable are not to be considered as critical since the present invention contemplates the use generally of phosphorus pentoxide as a catalyst in promoting the acylation of thiophenes with a carboxylic acid.

The reaction rate of the process is largely a function of the temperature, the upper limit of temperature being dependent on the boiling point of the reactants at the specific pressure of the reaction. In general, temperatures varying between about 0° C. and about 150° C. and preferably between about 70° C. and about 110° C. have been found satisfactory for effecting the acylation reaction. The pressure may vary from atmospheric up to about six atmospheres. As a matter of fact, the pressure may be increased to a still greater amount and theoretically the effect would be toward increased reaction, but from a practical standpoint this is not a very great effect with reactions such as involved herein which go readily at normal pressures. The temperature to be employed will depend on the time of reaction and on the carboxylic acid employed. Ordinarily, a pressure sufficient to maintain the reactants in the liquid phase is employed and this is more or less dependent on the particular temperature involved. As a general rule, the higher the temperature, the higher the pressure and the lower the reaction time needed. It is, of course, to be understood that these reaction variables are more or less interdependent. The reaction period will generally, however, vary from about 1 to about 10 hours. In general, reaction periods less than 1 hour were found to be insufficient for completion of the acylation reaction, even at the higher temperatures.

The carboxylic acids used herein as acylating agents may be either aliphatic or aromatic and may be either saturated or unsaturated. Carboxylic acids of either aliphatic or aromatic derivation may likewise be employed with advantage. Thus, representative carboxylic acids to be used in this invention include the saturated fatty acids such as acetic acid, propionic acid, etc., aromatic acids such as benzoic acid and substituted benzoic acids, etc. Representative of the unsaturated acids which may be used is oleic acid. These carboxylic acids are given merely by way of examples and are not to be construed as limiting since other organic carboxylic acids which will readily suggest themselves to those skilled in the art may likewise be used. Formic acid, as in many other instances, does not function in a manner similar to the other saturated fatty acids and is not to be included in the term carboxylic acid as used throughout the present specification and appended claims.

The process contemplated herein, however, has been found to be particularly adaptable to the preparation of the higher thienyl ketones, that is those derivatives having acyl groups higher than acetyl attached to the thiophene ring. Indeed, it would appear that the yield of desired ketone is directly related to the chain length of the carboxylic acid acylating agent used. Thus, when phosphorus pentoxide and acetic acid are employed in preparing acetyl thiophene, a certain amount of charring occurs which tends to decrease the yield of desired product. This phenomena, unexpectedly, is not encountered when the higher fatty acids or other long chain acids having more than two carbon atoms, such as oleic and benzoic acids are used. The result is, as will be shown hereinafter, that correspondingly high yields of the long chain thienyl ketones are obtained.

It is generally believed that the chemical behavior of thiophene is very similar to that of benzene. However, there are some very striking differences, one of which is the distinction to be drawn between the conditions for acylation of benzene as compared with thiophene. This is illustrated by the fact that the acylating catalysts ordinarily used in the acylation of benzene are not suitable for the acylation of thiophene. Moreover, catalysts which readily effect the acylation of thiophene will not always effect the acylation of benzene. This is particularly true in the present invention. The use of a carboxylic acid in the presence of phosphorus pentoxide which permits the acylation of thiophene to proceed in an efficient manner is inactive in the acylation of benzene. Thus, phosphorus pentoxide which is inactive catalytically with a carboxylic acid in the acylation of benzene is, in accordance with the present invention, a preferable catalyst for the acylation of thiophene.

In addition to thiophene, substituted derivatives of thiophene having one or more substituent groups attached to the thiophene ring may be acylated in accordance with the process of this invention. Thus, the method described herein contemplates the acylation of alkyl, aryl, alkoxy, halogen substituted and similar derivatives of thiophene. In conducting the acylation, it has been found preferable either to add phosphorus pentoxide in small portions to a mixture of thiophene and carboxylic acid or to drop the acid slowly into a mixture of thiophene and phosphorus pentoxide to avoid excessive charring. After the addition of reactants is complete, the mixture is maintained at a temperature varying between about 0° C. and about 150° C. for from about 1 to about 10 hours. At the end of this period, the resulting product is washed with water, neutralized with an alkaline solution such as sodium carbonate or hydroxide and then distilled to yield the desired thienyl ketone.

The following examples are for the purpose of illustrating modes of effecting acylation of thiophene in accordance with the process of this invention, and are not to be considered as limiting the same, as to the specific conditions or carboxylic acid set forth.

*Example I*

Sixty grams (1 mole) of glacial acetic acid, 42 grams (0.5 mole) of thiophene and 10 grams (.07 mole) of phosphorus pentoxide were stirred together, a considerable amount of heat being evolved. The mixture was refluxed for four hours at 85–90° C., water-washed, and neutralized with sodium carbonate solution. Distillation yielded 7 grams (11% of theory) of 2-acetylthiophene having a boiling point at 5 mm. pressure of 79° C.

*Example II*

Into a stirred mixture of 168 grams (2 moles) of thiophene and 71 grams (0.5 mole) of phosphorus pentoxide was dropped slowly 60 grams (1 mole) of glacial acetic acid over a period of one hour. The mixture was stirred for 2.5 hours longer and heated in a water-bath for 1.25 hours longer, the maximum temperature attained being 80° C. The product was water-washed, neutralized with sodium carbonate solution, and distilled. Fifty-six grams (44.4% of theory) of 2-acetylthiophene was collected having a boiling point at 7 mm. pressure of 87° C.

*Example III*

To a mixture of 168 grams (2 moles) of thiophene and 172 grams (1 mole) of capric acid held at 70° C. was added 71 grams (0.5 moles) of phosphorus pentoxide over a period of 10 minutes. The reaction mixture was then refluxed for 2 hours at 90–111° C. The product was poured into 10% sodium hydroxide solution and the organic layer was water-washed and distilled. Forty-two grams of 2-caprylthiophene, was collected (17.6% of theory), having a boiling point at 12 mm. pressure of 180° C.

*Example IV*

To 141 grams (1 mole) of phosphorus pentoxide which was slurried with 300 cubic centimeters of benzene and ice cooled was added 60 grams (1 mole) of acetic acid and 84 grams (1 mole) of thiophene. The ice bath was then removed and the mixture slowly warmed to reflux and held at 85–90° C. for three hours. During this time a black resinous sludge formed that was very hard and brittle upon cooling. The benzene soluble portion was decanted therefrom and the residue water washed and neutralized with sodium carbonate solution. Distillation yielded 34 grams (27% of theory) of 2-acetylthiophene.

*Example V*

To a slurry of 142 grams (1 mole) of phosphorus pentoxide in 500 milliliters of benzene were added 172 grams (1 mole) of capric acid and 84 grams (1 mole) of thiophene, respectively. There was no observed heat of reaction. The mixture was heated at reflux of 80° C. for six hours. At the end of this period, the mixture was cooled and the benzene soluble layer decanted from a remaining hard, brittle sludge. This residue was treated with caustic solution to remove excess capric acid therefrom and the resulting organic layer water-washed and distilled. 146 grams of crude acylated thiophene were obtained. Distillation yielded 100 grams of 2-capryl thiophene and 46 grams of high boiling material having a boiling range of 230–250° C. at 8 mm. of mercury. Crystallization of this latter material from hot absolute alcohol gave white cotton-like crystals of 2,5-dicapryl thiophene having a melting point of 109° C. The yield of 100 grams of 2-capryl thiophene represents 84% of theory.

*Example VI*

To a slurry of 71 grams (0.5 mole) of $P_2O_5$ in 500 milliliters of benzene were added 172 grams (1 mole) of capric acid and 84 grams (1 mole) of thiophene, respectively. There was no observed heat of reaction. The mixture was heated at reflux of 80° C. for six hours. At the end of this period the mixture was cooled and the benzene soluble layer decanted from a remaining hard sludge. This residue was treated with caustic solution to remove excess capric acid therefrom and the organic layer water-washed and distilled. 78 grams of capryl thiophene were obtained, representing a yield of 65% of the theory.

*Example VII*

To 142 grams (1 mole) of phosphorus pentoxide in 500 milliliters of benzene were added, in turn, 84 grams (1 mole) of thiophene and 282 grams (1 mole) of oleic acid. The mixture was refluxed for six hours, cooled, washed with sodium hydroxide solution, water-washed free of caustic and distilled under reduced pressure. 190 grams of 2-oleyl thiophene were obtained over the range of from 218 to 280° C. An additional 150 grams of residue boiling above 280° C. was also obtained. Analysis indicated that this material was a dimer of oleyl thiophene. The theoretical yield was 348 grams and a total of 340 grams of product were obtained. This represents a yield of 97% of the theory.

*Example VIII*

Seventy-one grams (0.5 mole) of phosphorus pentoxide were weighed directly into 300 milliliters of benzene. To this mixture were added, in turn, 84 grams (1 mole) of thiophene and 122 grams (1 mole) of benzoic acid. The mixture was refluxed for two hours, cooled, and the benzene layer poured into an ice-cooled solution of sodium hydroxide and stirred to assure complete removal of unreacted benzoic acid and anhydride. The benzene and unreacted thiophene were removed by distillation to yield 61 grams of 2-benzoyl thiophene. This represents a 66% conversion to the ketone. Rectification of this product by distillation gave 50 grams of benzoyl thiophene having a boiling point at 6 mm. pressure of 160–163° C. which subsequently yielded crystals of melting point 56.5–57° C.

From the above examples, it will be evident that phosphorus pentoxide is an effective catalyst in promoting the acylation of thiophene with carboxylic acids. It is apparent that the use of a diluent in the reaction mixture, such as benzene, substantially increases the yield of acylated thiophene. This is illustrated by Examples V–VIII in which a slurry of phosphorus pentoxide in benzene was employed. Moreover, as pointed out above, the acylation process described herein is particularly effective in producing the higher thienyl ketones. Thus, the process of the present invention affords a convenient and efficient one-step method in preparing thienyl ketones from carboxylic acids and thiophenes.

Acylated thiophenes as produced in accordance with this invention have found a variety of uses and may be employed as solvents, dye intermediates, addition agents for petroleum fractions, plasticizers, odorants, perfume diluents, resin intermediates and intermediates for chemical synthesis. Long chain alkyl thienyl ketones may also be utilized as synthetic lubricants, waxes, extreme pressure additives for mineral oils and anti-foaming agents.

We claim:

1. A process for nuclear acylation of an acylatable thiophene compound to yield a product having an acyl radical attached to the thiophene nucleus of said compound, which comprises reacting an acylatable thiophene compound with an aliphatic carboxylic acid in the presence of phosphorus pentoxide.

2. A process for nuclear acylation of an acylatable thiophene compound to yield a product having an acyl radical attached to the thiophene of said compound, which comprises reacting an acylatable thiophene compound with a saturated fatty acid in the presence of phosphorus pentoxide.

3. A process for nuclear acylation of an acylatable thiophene compound to yield a product having an acyl radical attached to the thiophene nucleus of said compound, which comprises reacting an acylatable thiophene compound with an aliphatic carboxylic acid having more than two carbon atoms in the presence of phosphorus pentoxide.

4. A process for nuclear acylation of an acylatable thiophene compound to yield a product having an acyl radical attached to the thiophene nucleus of said compound, which comprises reacting an acylatable thiophene compound with an aliphatic carboxylic acid in the presence of an amount of phosphorus pentoxide between about 0.05 and about 1.0 mole per mole of said acid.

5. A process for nuclear acylation of an acylatable thiophene compound to yield a product having an acyl radical attached to the thiophene nucleus of said compound, which comprises reacting an acylatable thiophene compound with oleic acid in the presence of an amount of phosphorus pentoxide between about 0.05 and about 1.0 mole per mole of acid, 6. A process for nuclear acylation of an acylatable thiophene compound to yield a product having an acyl radical attached to the thiophene nucleus of said compound, which comprises reacting an acylatable thiophene compound with capric acid in the presence of an amount of phosphorus pentoxide between about 0.05 and about 1.0 mole per mole of acid.

7. A process for nuclear acylation of an acylatable thiophene compound to yield a product having an acyl radical attached to the thiophene nucleus of said compound, which comprises reacting an acylatable thiophene compound with acetic acid in the presence of an amount of phosphorus pentoxide between about 0.05 and about 1.0 mole per mole of acid.

8. A process for acylating thiophene, which comprises reacting the same with an aliphatic carboxylic acid in the presence of phosphorus pentoxide.

9. A process for acylating thiophene, which comprises reacting the same with oleic acid in the presence of phosphorus pentoxide.

10. A process for acylating thiophene, which comprises reacting the same with capric acid in the presence of phosphorus pentoxide.

11. A process for acylating thiophene, which comprises reacting the same with acetic acid in the presence of phosphorus pentoxide.

12. A process for nuclear acylation of an acylatable thiophene compound to yield a product having an acyl radical attached to the thiophene nucleus of said compound, which comprises reacting an acylatable thiophene compound with an aliphatic carboxylic acid at a temperature between about 0° C. and about 150° C. for a period of from about 1 to about 10 hours, in the presence of an amount of phosphorus pentoxide between about 0.05 and about 1.0 mole per mole of acid.

13. A process for nuclear acylation of an acylatable thiophene compound to yield a product having an acyl radical attached to the thiophene nucleus of said compound, which comprises reacting an acylatable thiophene compound with a saturated fatty acid at a temperature between about 0° C. and about 150° C. for a period of from about 1 to about 10 hours, in the presence of an amount of phosphorus pentoxide between about 0.05 and about 1.0 mole per mole of acid.

14. A process for nuclear acylation of an acylatable thiophene compound to yield a product having an acyl radical attached to the thiophene nucleus of said compound, which comprises reacting an acylatable thiophene compound with an unsaturated aliphatic carboxylic acid at a temperature between about 0° C. and about 150° C. for a period of from about 1 to about 10 hours, in the presence of an amount of phosphorus pentoxide.

15. A process for acylating thiophene, which comprises reacting the same with an aliphatic carboxylic acid at a temperature between about 0° C. and about 150° C. for a period of from about 1 to about 10 hours, in the presence of an amount of phosphorus pentoxide between about 0.05 and about 1.0 mole per mole of acid.

16. A process for acylating thiophene, which comprises the steps of adding phosphorus pentoxide to a mixture of thiophene and an aliphatic carboxylic acid, permitting the resulting mixture to react at a temperature between about 0° C. and about 150° C. for a period of from about 1 hour to about 10 hours, and distilling the reaction product mixture so obtained to yield an acyl thiophene.

17. A process for acylating thiophene, which comprises the steps of slowly introducing an aliphatic carboxylic acid into a mixture of thiophene and phosphorus pentoxide, permitting the resulting mixture to react at a temperature between about 0° C. and about 150° C. for a period of from about 1 hour to about 10 hours, and distilling the reaction product mixture so obtained to yield an acyl thiophene.

HOWARD D. HARTOUGH.
ALVIN I. KOSAK.

REFERENCES CITED

The following references are of record in the file of this patent:

Caesar and Sachanen, Ind. Eng. Chem. 40, 922 (1948).
Alles, J. Pharm. & Exp. Ther., 72, 265 (1941).
Whitemore, "Organic Chemistry," page 895, Van Nostrand, N. Y., 1937.
Richter, "Organic Chemistry," 649, 650, John Wiley, N. Y., 1938.
Berkman, Catalysis, page 658, Reinhold Publishing Company, 1940.
Chemical Abstracts 33: 6813:9 (1939).
Annalen, 424, 1 (1921).

Certificate of Correction

Patent No. 2,478,484                                  August 9, 1949

HOWARD D. HARTOUGH ET AL.

It is hereby certified that errors appear in the printed specification of the above numbered patent requiring correction as follows:

Column 6, line 16, for "allustrated" read *illustrated*; line 47, after the syllable "phene" insert the word *nucleus*;

and that the said Letters Patent should be read with these corrections therein that the same may conform to the record of the case in the Patent Office.

Signed and sealed this 24th day of January, A. D. 1950.

[SEAL]

THOMAS F. MURPHY,
*Assistant Commissioner of Patents.*